(12) United States Patent
Yamada et al.

(10) Patent No.: US 7,280,157 B2
(45) Date of Patent: Oct. 9, 2007

(54) IMAGE DISPLAY DEVICE

(75) Inventors: Haruyoshi Yamada, Shiojiri (JP); Chihiro Tsukinokizawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 633 days.

(21) Appl. No.: 10/796,205

(22) Filed: Mar. 10, 2004

(65) Prior Publication Data

US 2004/0252236 A1  Dec. 16, 2004

(30) Foreign Application Priority Data

Mar. 24, 2003  (JP)  ............................. 2003-080721
Mar. 5, 2004  (JP)  ............................. 2004-062308

(51) Int. Cl.
*H04N 1/032* (2006.01)
*H04N 5/64* (2006.01)

(52) U.S. Cl. ...................... 348/552; 348/553; 348/836; 358/1.1; 358/401

(58) Field of Classification Search ................ 348/552, 348/553, 836, 839, 789, 207.2; 358/1.1, 358/1.14, 3.32, 401; 347/170, 222, 245, 347/263, 177; 400/693; 399/110
See application file for complete search history.

(56) References Cited

U.S. PATENT DOCUMENTS

| | | | | | |
|---|---|---|---|---|---|
| 4,587,569 | A | * | 5/1986 | Nakamura et al. | 358/296 |
| 4,626,926 | A | * | 12/1986 | Nakamura | 358/296 |
| 4,635,132 | A | * | 1/1987 | Nakamura | 358/296 |
| 4,641,980 | A | * | 2/1987 | Matsumoto et al. | 400/693 |
| 5,019,915 | A | * | 5/1991 | Fujito | 386/46 |
| 5,111,285 | A | * | 5/1992 | Fujita et al. | 358/500 |
| 5,235,676 | A | * | 8/1993 | Clay et al. | 358/1.14 |
| 5,377,269 | A | * | 12/1994 | Heptig et al. | 726/20 |
| 6,017,118 | A | | 1/2000 | Gasvoda et al. | |
| 6,366,359 | B1 | * | 4/2002 | Garland | 358/1.15 |
| 6,462,839 | B1 | * | 10/2002 | Short | 358/474 |
| 6,530,634 | B1 | * | 3/2003 | Hara | 347/7 |
| 6,927,871 | B1 | * | 8/2005 | Silverbrook et al. | 358/1.15 |
| 6,961,152 | B1 | * | 11/2005 | Watanabe et al. | 358/296 |
| 6,963,423 | B2 | * | 11/2005 | Ogasahara et al. | 358/1.8 |
| 7,079,191 | B1 | * | 7/2006 | Kitamura et al. | 348/552 |
| 7,126,714 | B1 | * | 10/2006 | Inui | 358/1.16 |
| 7,182,534 | B2 | * | 2/2007 | Proulx et al. | 400/693 |
| 7,231,159 | B2 | * | 6/2007 | Combs et al. | 399/81 |

FOREIGN PATENT DOCUMENTS

| | | |
|---|---|---|
| CN | 1259087 A | 7/2000 |
| JP | A-08-090873 | 4/1996 |
| JP | A-2002-107663 | 4/2002 |

* cited by examiner

*Primary Examiner*—David Ometz
*Assistant Examiner*—Jean W. Désir
(74) *Attorney, Agent, or Firm*—Oliff & Berridge, PLC

(57) ABSTRACT

To provide an image display device, such as a liquid crystal receiver or the like, that has a printer incorporated therein for printing a displayed image on the spot, upon switching-on of a television receiver, an image forming device is activated and images or the like are projected onto a display screen. Here, by appropriately operating an operation section or the like, a command requiring images being displayed on the display screen to be printed out, is inputted into the image forming device. As a result, the printing command signal is issued from the data processing section provided in the output section to the printer unit, together with an image file appropriately converted from video signals. The printer unit develops the input image file, prints the corresponding image, and outputs it.

12 Claims, 10 Drawing Sheets

IMAGE DISPLAY DEVICE

BACKGROUND OF THE INVENTION

1. Field of Invention

The present invention relates to an image display device, such as a television receiver or the like, and more particularly, it relates to an image display device of a type having a printer incorporated therein.

2. Description of Related Art

In image display devices with a large-sized screen, there are various television receivers in which an image from a projector using, e.g., liquid crystal light valves is reflected by a mirror and projected onto a transparent rear screen from its rear surface (see Japanese Unexamined Patent Application Publication No. 2002-107663).

SUMMARY OF THE INVENTION

However, the television receivers as described above are used exclusively to watch images on the display screen thereof, and can neither store nor print displayed images.

One possible solution to this problem would be to incorporate a printer into the television receiver and print out an image formed on the display screen thereof. However, merely incorporating a printer into the television receiver causes the following inconveniences. Even if the printer alone goes out of order, the television receiver must be sent out for repair in its entirety, so that television broadcast cannot be enjoyed for the duration of repair. Also, it is necessary to provide a port to replace an ink ribbon, on the front or side surface of the television receiver, although the ink ribbon is a consumable article that is low in replacement frequency. This limits the flexibility in the internal structure and in the appearance design of the television receiver.

Accordingly, the present invention provides an image display device, such as a television receiver or the like, that is capable of easily printing a displayed image on the spot.

The present invention also provides an image display device having a printer incorporated therein that does not need to be sent out for repair in its entirety even if the printer goes out of order.

The present invention also provides an image display device that allows a port to replace consumable articles to be formed in a manner so as not to impair the appearance of the device.

In order to address the above-described problems, an aspect of the present invention provides an image display device that includes a display screen formed on the front of a cabinet and occupying the main part of the front; an image forming device that, based on read image signals, forms an image corresponding to the image signals, on the display screen; and a printer unit demountably accommodated in a recess formed in the cabinet. Here, the aforementioned "read image signals" include reproduced television signals, video signals read from a video reproducing unit, and image data read from various storage media.

Since the above-described image display device has a printer unit demountably accommodated in the recess formed in the cabinet, it can print out an image formed on the display screen thereof on the spot. Also, when its printer unit goes out of order, such an image display device allows a user to easily withdraw the printer unit from the image display device. Therefore, the user can separate the printer unit alone and send it out for repair. Herein, by performing an appropriate separation processing, it is possible to watch a television broadcast without interruption, with the operation conditions of the image display device body kept normal, although printing is not possible. Furthermore, because such an image display device can be configured so that consumable articles therefore are replaced when the printer unit is withdrawn, a port to replace consumable articles can be formed at a position such as not to impair the appearance of the device, such as the rear surface or a side surface of the printer unit.

In an aspect, the above-described image display device further includes a guide to guide the movement of the printer unit in the recess during the mounting and demounting of the printer unit; and connector that allows the exchange of signals between the image forming device and the printer unit, and that is disconnectable and connectable therebetween. This facilitates the mounting and demounting of the printer unit, and increases the efficiency of work, such as the replacement of consumable articles.

In another aspect, the above-described image display device further includes a locking device to bring the printer unit into a locked state where the printer unit is fixed to the recess, in a state where the printer unit has been accommodated in the recess and the electrical connection between the image forming device and the printer unit has been established by the connector. This reduces the likelihood or prevents the printer unit from accidentally dashing out from the recess, and protects the printer unit and the internal circuitry thereof from damage, for example, during conveyance of the image display device itself or during an operation of the printer unit.

In another aspect, the above-described image display device further includes a lock element to prevent the locked state of the printer unit brought about by the locking device from being released. This allows the printer unit to be reliably held in the recess, and reduces the likelihood or prevents the occurrence of a malfunction of the locking device.

In another aspect, the above-described image display device further includes a release sensor to detect that the locked state of the printer unit brought about by the locking device has been released. With this feature, since it can be detected that the printer unit is in a state of readiness for mounting/demounting, it is possible to easily determine whether the operations of the printer unit and the image forming device must be switched into states independent of each other.

In another aspect, the above-described image display device further includes a display screen formed on the front of a cabinet and occupying the main part of the front; an image forming device that, based on read image signals, forms an image corresponding to the image signals, on the display screen; a printer unit demountably accommodated in a recess formed in the cabinet; a locking device to bring the printer unit into a locked state where the printer unit is fixed to the recess, in a state where the printer unit has been accommodated in the recess and the electrical connection between the image forming device and the printer unit has been established by the connector device; a release sensor to detect a release operation with respect to the locked state of the printer unit brought about by the locking device; and a controller to cause the printer unit to perform forced print interruption processing if the printer unit is in the course of performing print processing or preparing for print processing, when the release of the locked state has been detected by the release sensor.

With these features, the occurrence of inconveniences caused by the user forcedly demounting the printer unit can be reduced or prevented and the ease of use is enhanced.

Specifically, even when a print job has not yet been completed in the printer unit, the print job can be forcedly terminated or interrupted. This makes it possible to reduce the likelihood or prevent paper onto which the printing has been interrupted, from causing a paper jam in the printer unit, or reduce the likelihood or prevent a print head from being damaged.

In another aspect of the above-described image display device, when the release of the locked state has been detected by the release sensor, if there is any print processing that is in course of being performed or prepared in the printer unit, the controller interrupts a power supply to the printer unit after the print interruption processing. With this feature, a power supply to the printer unit can be stopped after various interruption processing, necessary for the separation of the printer unit, have been completed. That is, it is possible to prevent the power source for the printer unit from being stopped in an indefinite operating state, thereby enhancing the maintainability of the printer unit and the image display device.

In another aspect of the above-described image display device, the controller further includes a device to terminate the exchange of signals between the image forming device and the printer unit, such as an interruption circuit, when the release of the locked state has been detected by the release sensor. With this feature, it is possible to reduce the likelihood or prevent the occurrence of a malfunction of the image forming device resulted from the separation of the printer unit.

In another aspect of the above-described image display device, the controller includes a first CPU provided in the image forming device and a second CPU provided in the printer unit. The controller causes the printer unit to perform print processing by passing data signals between the first and seconds CPUs by communications based on a predetermined connection protocol, as well as it terminates in advance the communications based on the predetermined connection protocol between the first, second, and first CPUs before interrupting a power supply to the printer unit. With these features, smooth communications can be secured between the first CPU on the image forming device side and the second CPU on the printer unit side, which constitute together the controller. Also, in separating the printer unit, the communications between these CPUs can be smoothly interrupted without troubles.

In another aspect, the above-described image display device further includes a locking sensor to detect that the printer unit is held in the locked state by the locking device. With this feature, since it can be detected that the image forming device and printer unit has entered into a state where they can be electrically connected with each other, the application of power to the printer unit and the control of signal outputs or the like can be reliably started up.

In another aspect of the above-described image display device, the locking sensor and the release sensor constitute a common detachable switch provided in the locking device, to detect the displacement of a movable member. They detect the locked state and the release of the locked state based on a state of the detachable switch. With this feature, the sharing of the component allows an economical construction to be achieved, thereby reducing the likelihood or preventing the discrepancy between operations of the locking sensor and release sensor that might arise when they were independent of each other.

In another aspect of the above-described image display device, when the return to the locked state has been detected by the locking sensor, if printing is under forced interruption due to the last demounting of the printer unit, the controller causes the printer unit to restart the interrupted printing. With this feature, the printing under interruption, due to the separation of the printer unit, is automatically restarted by mounting of the printer unit, thereby reducing the likelihood or preventing inconveniences such as a loss of necessary image data.

DETAILED DESCRIPTION OF EXEMPLARY EMBODIMENTS

Hereinafter, an image forming device according to an exemplary embodiment of the present invention will be specifically described with reference to the drawings.

Figure 1:
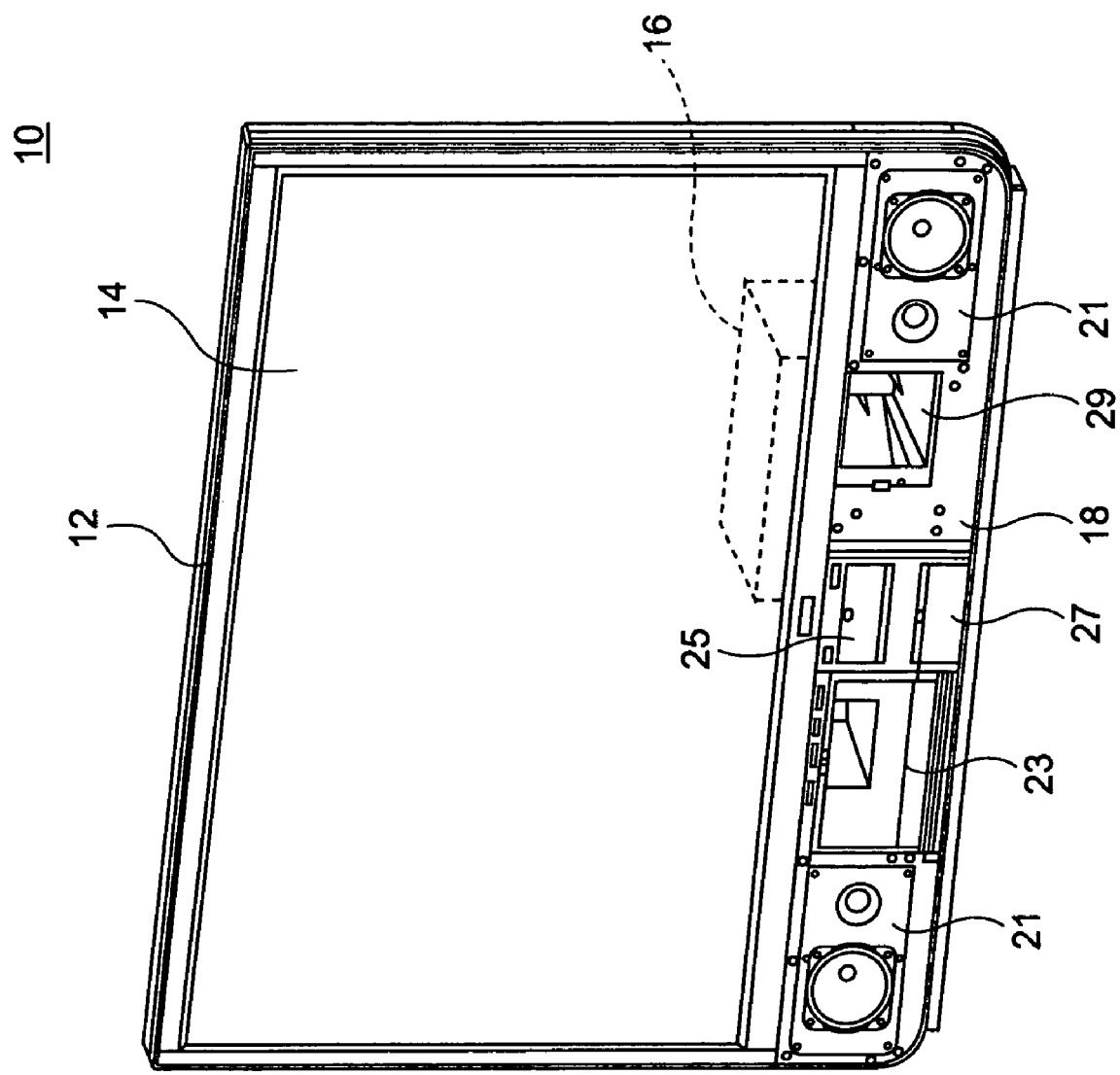
FIG. 1 is a schematic of a television receiver according to an exemplary embodiment.

FIG. 1 is a schematic mainly showing the front structure of a television receiver, serving as an image forming device, according to an exemplary embodiment. The television receiver 10 is a rear projector, and includes a display screen 14 on the front of a case 12 that is a thin cabinet with a rectangular front surface and an image forming device 16 formed inside the case 12, to project an image onto the display screen 14. On the front of the case 12 and below the display screen 14, there is provided a slender panel-shaped section 18 extending in the lateral direction.

The display screen 14 is a rear projection screen having a rectangular appearance. Television images formed by the image forming device 16, which includes liquid crystal light valves, liquid crystal panel, digital micro mirror device and the like, are projected from the rear surface of the display screen 14.

The image forming device 16 includes a television receiver section that reproduces video signals corresponding to a television image based on image signals from an antenna (not shown); and a projector section that produces optical projected images based on the video signals reproduced at the receiver section and video signals directly input from the outside, and projects them onto the display screen 14. Here, the projector section may have a projection lens that is used when, for example, illumination light from a light source lamp is made incident upon the liquid crystal light valve of each color that is optically modulated by video signals, and the image light after the modulation is projected onto the display screen 14.

The panel-shaped section 18 has a pair of speakers 21 disposed at the opposite ends thereof, and includes a printer unit 23, an operation section 25, and an interface section 27 interposed between the speakers. Out of these, the printer unit 23 is a demountable and replaceable color printer, and for example, it can print, onto paper, an image as-is copied from an image displayed on the display screen 14. The operation section 25 has operation buttons provided behind a cover, to change operational conditions of the television receiver 10. Also, on the periphery of the cover, the operation section 25 has a sensor to detect operation signals from a remote controller. In the interface section 27, various terminals to receive signals from external units including video reproduction units, such as a DVD (Digital Versatile Disk) and a personal computer are formed behind the cover. To the right of the operation section 25 and the interface section 27, there is provided a lamp replacement hole 29 to replace an illumination light source lamp (not shown) provided at the projector portion of the image forming device 16.

Figure 2:
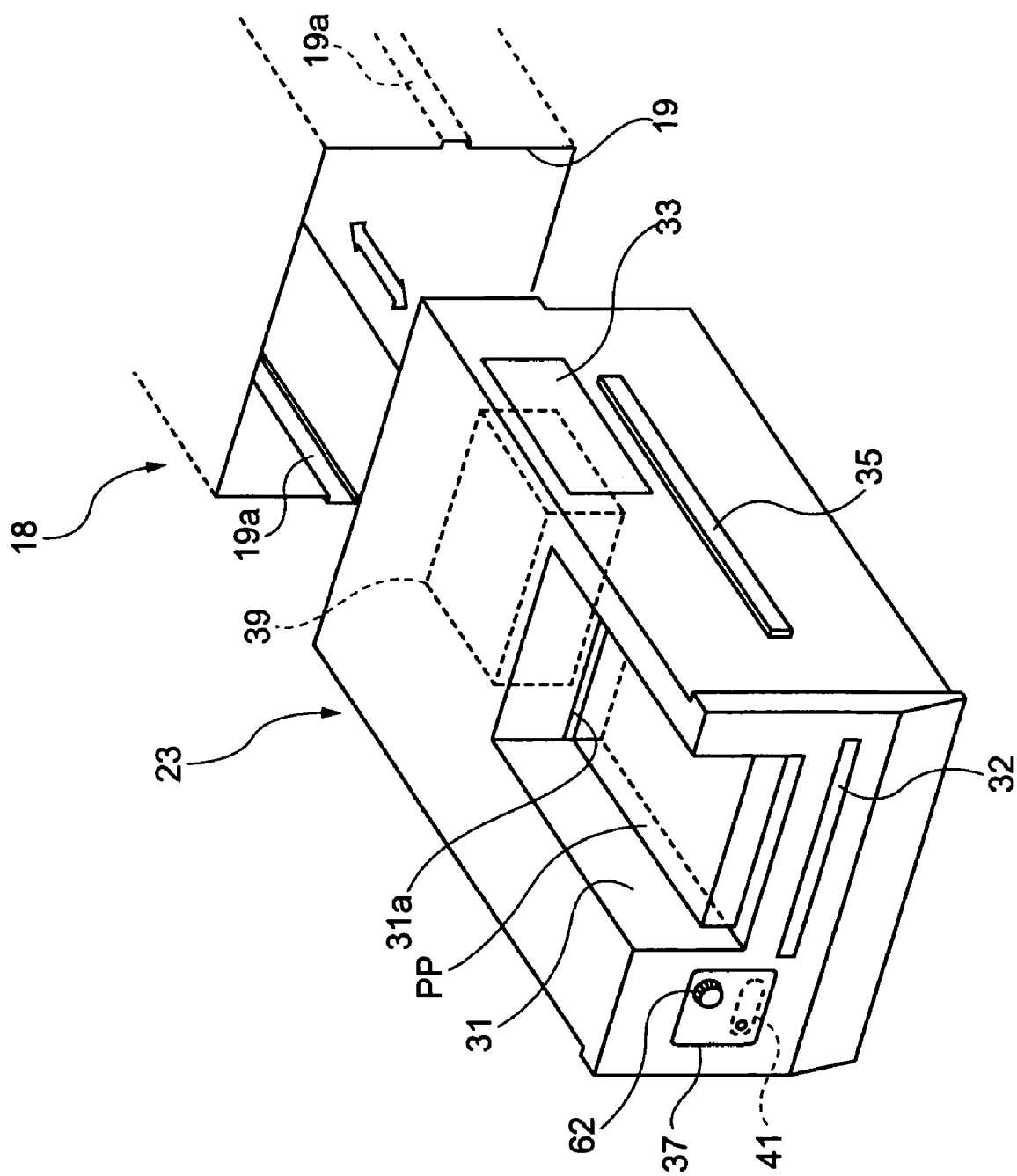
FIG. 2 is a schematic of the front side of a printer unit.
Figure 3:
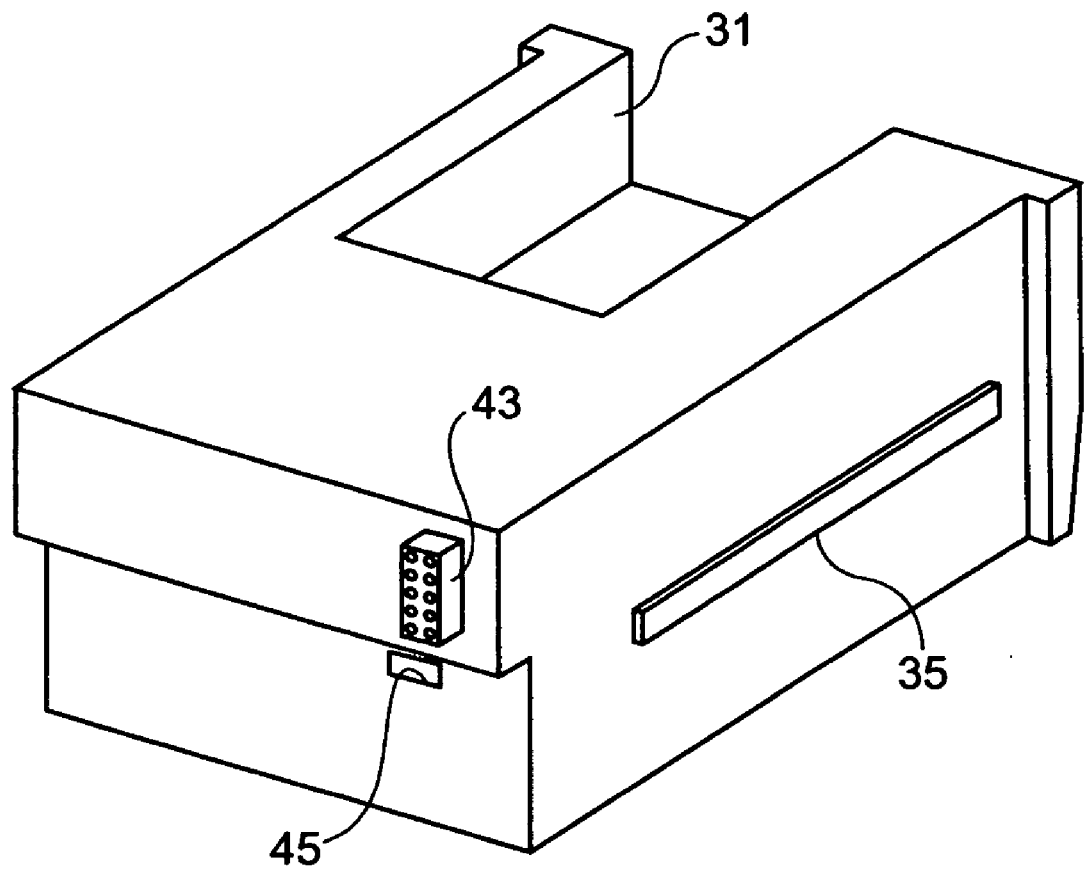
FIG. 3 is a schematic of the rear side of the printer unit.

FIG. 2 is a schematic of the printer unit 23 as seen from its front side. FIG. 3 is a schematic of the printer unit 23 as seen from its rear side. As can be seen from FIG. 2, the printer unit 23 is configured to be demountably engaged with a slot 19, which is a recess provided in the panel-shaped section 18. By withdrawing from the slot 19, the printer unit 23 can be easily separated electrically and mechanically from the television receiver 10, and can be subjected to conveyance, repair, or the like, as an independent unit accommodated in a rectangular parallelepiped case, namely, a box-shaped case.

In an upper position on its front side, the printer unit 23 has a paper feed tray 31 to accommodate printing paper PP. At the back of the paper feed tray 31, the printer unit 23 has a paper feed slot 31a. Below the paper feed tray 31, it has a paper discharge slot 32. On the right side surface of the printer unit 23, there is provided a lid, for example, a sliding open/close lid 33 to replace an ink ribbon cartridge 39 or the like mounted in the printer unit 23. Also, on both side surfaces of the printer unit 23, there are provided guide rails 35 extending along the back-and-forth direction. The guide rails 35 are fitted into respective guide grooves 19a provided in corresponding positions in the inner surface of the slot 19, in which the printer unit 23 is accommodated. The guide grooves 19a constitute guide device together with the guide rails 35, and allow a smooth and accurate back-and-forth movement of the printer unit 23 in the slot 19, by including rollers or the like (not shown) to smoothly slide the guide rails 35. On the front of the printer unit 23 and to the left of the paper feed tray 31, there is provided an openable/closable covering lid 37 that accommodates an operation lever 41 described later.

As shown in FIG. 3, on the rear surface of the printer unit 23, there is provided a connector 43 serving as a connector device to transmit/receive image signals and the like. In a state where the printer unit 23 has been completely pushed into the slot 19 to be accommodated therein, the connector 43 is engaged with a corresponding connector provided at the back of the slot 19, thereby enabling the power supply and data outputting and the like from the image forming device 16 to the printer unit 23. An opening 45 is formed below the connector 43. Inserted into the opening 45, is a locking member (described later) projected from the back of the slot 19.

Figure 4:
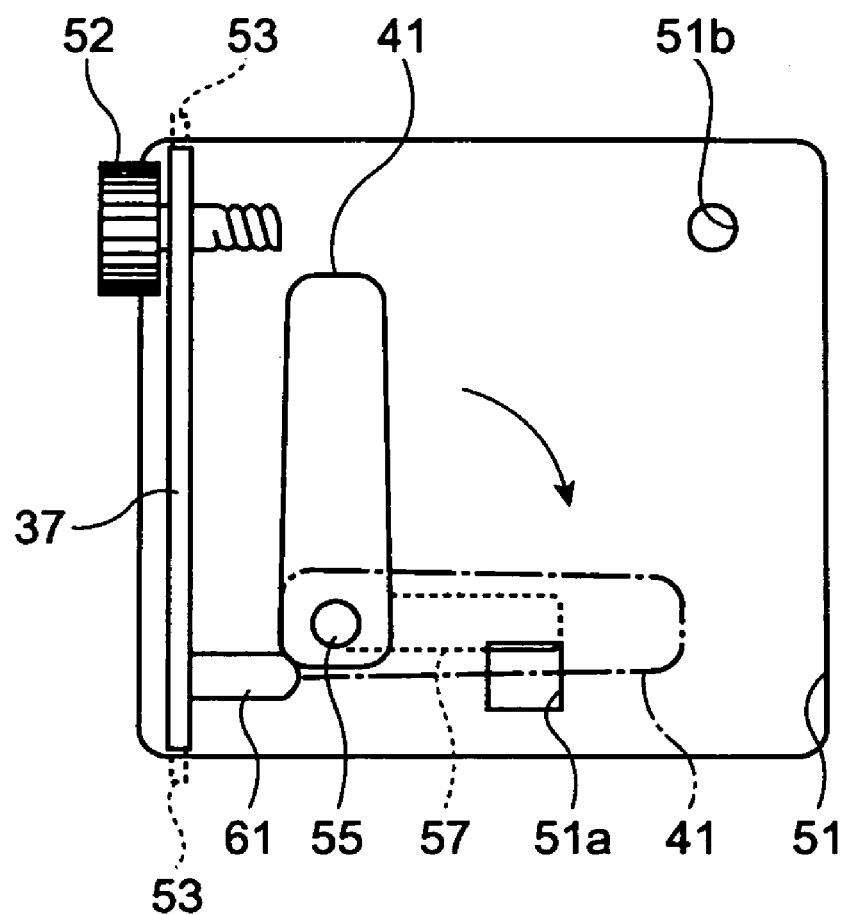
FIG. 4 is a schematic illustrating an operation lever provided in the printer unit.

FIG. 4 is a schematic illustrating an operation lever 41 provided on the front side of the printer unit 23 shown in FIG. 2. The covering lid 37 to protect the operation lever 41 is openable/closable and supported by a pair of support shafts 53. In a closed state, the covering lid 37 covers a concave portion 51. In an opened state, as shown in FIG. 4, it allows the user to operate the operation lever 41. The operation lever 41 provided in the concave portion 51 is turnable about a shaft member 55 extending in the direction perpendicular to the plane of the figure, and can assume either of an upward locking position indicated by a solid line and a lateral release position indicated by a chain line. A lock element 57 is fixed to the shaft member 55 behind the concave portion 51. The lock element 57 turns about the shaft member 55 together with the operation lever 41. The lock element 57 is inhibited from its clockwise turning by bringing the covering lid 37 into a closed state with the lock element 57 being in the horizontal position as shown in FIG. 4.

Specifically, the covering lid 37 has a lock pin 61 protruded from its rear surface, and by bringing the covering lid 37 into a closed state, the lock pin 61 can be inserted into a hole 51a formed in the concave portion 51. The lock pin 61 can prevent the lock element 57 located in the horizontal position from clockwise turning, and can prevent the operation lever 41 located at the locking position from turning, thereby holding the operation lever 41 in the locking position. Here, the covering lid 37 has a screw member 52 mounted thereon. Screwing the front end of the screw member 52 into a screw hole 51b provided in the concave portion 51 allows the covering lid 37 to be fixed into a closed state.

Figure 5:
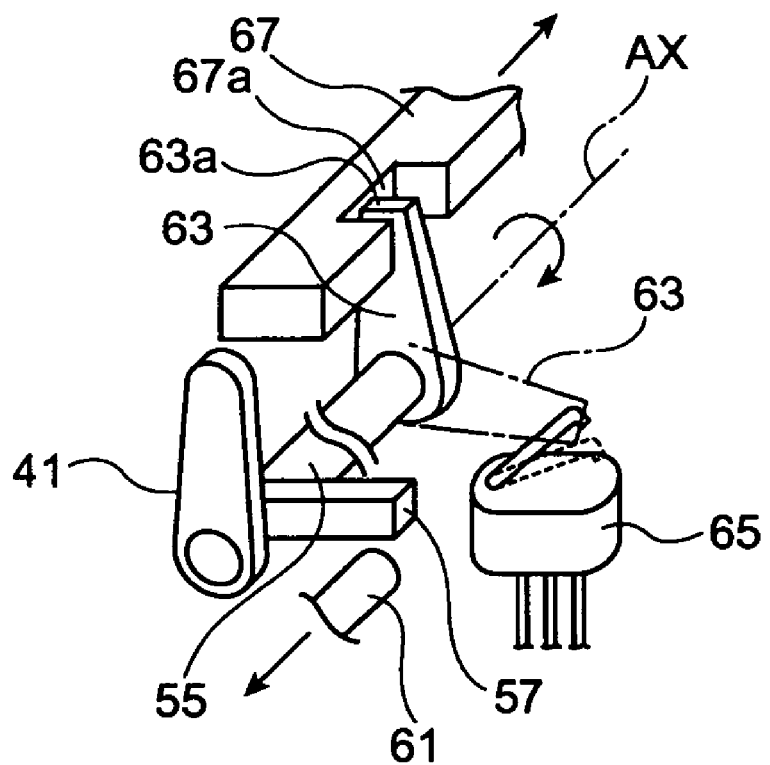
FIG. 5 is a schematic illustrating the construction of a locking unit.

FIG. 5 is a schematic illustrating the structure of a locking unit including the operation lever 41 shown in FIG. 4 and extending backward direction of it. The locking unit 70 serves as the locking device, and includes: the operation lever 41; the shaft member 55 supported about a turning axis AX and extending from the operation lever 41; the lock element 57 and a locking pawl 63, both fixed to the shaft member 55 and turning together; a detachable switch 65 acting under the rotation of the locking pawl 63; and a locking member 67 inhibited from its recession by the locking pawl 63. In the illustrated locking unit 70, first, retreating the lock pin 61 attached to the covering lid 37 to the basal side thereof allows the lock element 57 to turn, and enabling the operation lever 41 to turn to the release position clockwise turned by approximately 90 degrees from the illustrated lock position. When the operation lever 41 is located in the locking position, the front end 63a of the locking pawl 63 is fitted in an incision portion 67a formed in the locking member 67 extending from behind of the operation lever 41, and the locking member 67 is fixed with respect to the printer unit 23 including the locking pawl 63 and the like. Here, the locking member 67 has been inserted from the device body side into the opening 45 provided in the rear surface of the printer unit 23, when inserting the printer unit 23 into the slot 19. Upon turning of the operation lever 41 from the illustrated locking position to the release position, the front end 63a of the locking pawl 63 slips off the incision portion 67a of the locking member 67. This allows the locking member 67 on the device body side to move backward with respect to the printer unit 23 including the locking pawl 63 and the like. That is, the fixation of the printer unit 23 is released, so that the printer unit 23 can be withdrawn forward from the slot 19. Herein, the clockwise turning of the operation lever 41 causes the locking pawl 63 to press the detachable switch 65. As a result, the detachable switch 65 enters into action, and its position is switched from an off-position to an on-position. Conversely, when the operation lever 41 is returned from the release position to the locking position, the detachable switch 65 is put back from the on-position to the off-position.

Figure 6:
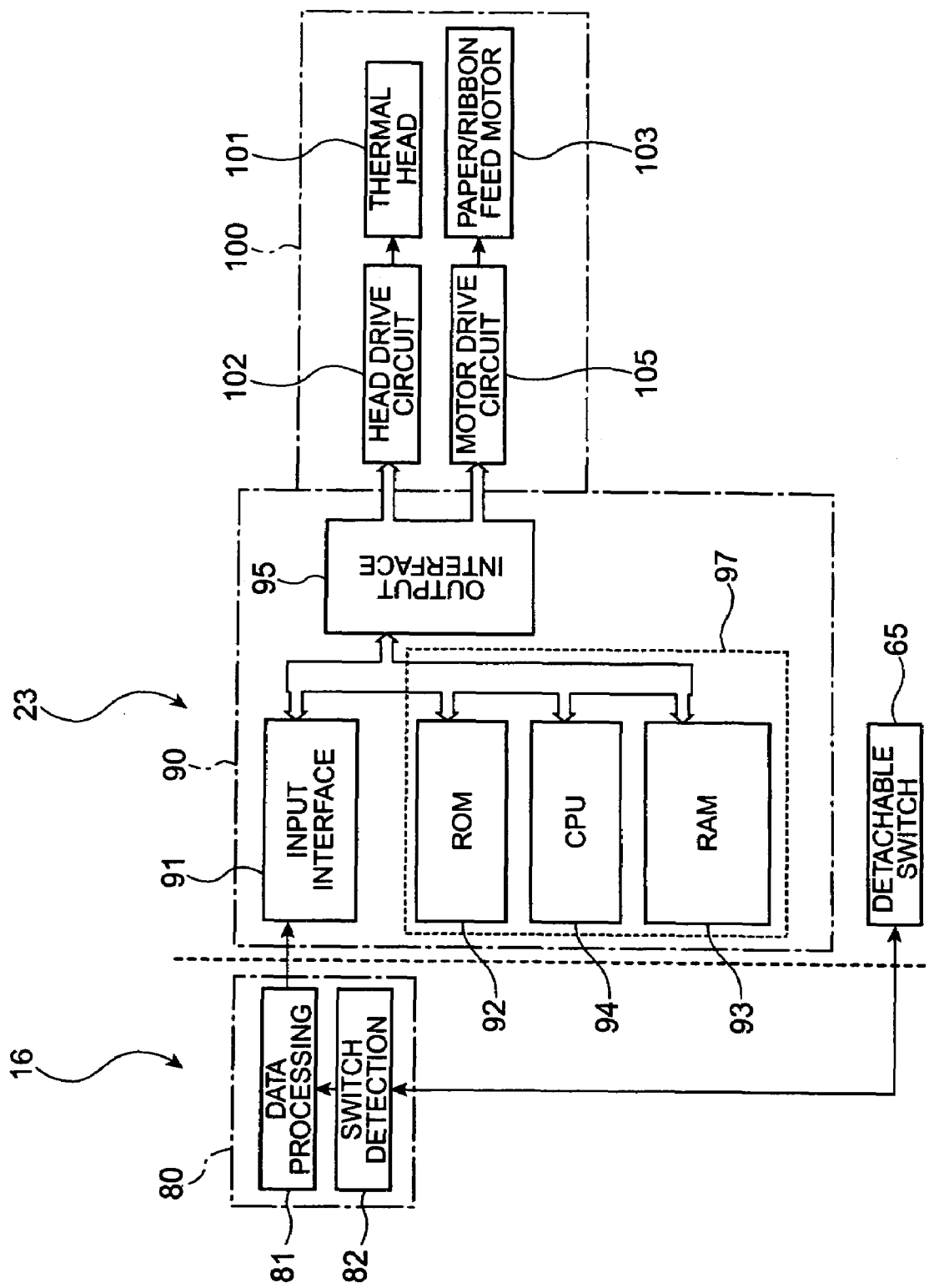
FIG. 6 is a schematic illustrating the main circuitry of the television receiver.

FIG. 6 is a schematic of the main circuitry of the television receiver 10 shown in FIG. 1. On the image forming device 16 side, there is provided an output section 80 serving as an interface with the printer unit 23. The output section 80 includes a data processing section 81 into which video signals corresponding to an image displayed on the display screen 14 are input as image signals, and a switch detecting section 82 that supplies power to the detachable switch 65 provided in the printer unit 23 and that detects whether the detachable switch 65 is in an on-position or an off-position. Here, the data processing section 81 outputs a command, such as a print command, received from the body side of the image forming device 16, to a control section 90 of the printer unit 23. Also, the data processing section 81 creates an image file of an appropriate form corresponding to a still image captured from video signals corresponding to an image displayed on the display screen 14, and outputs transfer data including this image file to the control section 90 of the printer unit 23. Herein, the data processing section 81 captures, at a definite timing, video signals corresponding to a display on the display screen 14, and creates transfer data including image files of various forms including, e.g., JPG. This transfer data continues to be created by data conversion as long as images are being displayed on, e.g., the display screen 14. When it is determined by the switch detecting section 82 that the detachable switch 65 is in an off-position, an electrical gate is turned on. Thereby the transfer data is periodically output to the control section 90 of the printer unit 23. When it is determined by the switch detecting section 82 that the detachable switch 65 is in an on-position, it is determined that the operation lever 41 has been operated so as to shift from the locking position to the release position. Therefore, if there is any data under transmission, the data processing section 81 immediately stops the transmission of transfer data, as an interruption circuit.

Simultaneously, the data processing section 81 outputs an appropriate printer separation warning signal to the circuitry on the body side of the image forming device 16. This reduces the likelihood or prevents the occurrence of a failure, such as a hang-up due to an abnormal operation of the image forming device 16. If the state of the detachable switch 65 cannot be detected by the switch detecting section 82, it is determined that this is because the printer unit 23 has been withdrawn from the slot 19 and is in a state independent of the television receiver 10. Accordingly, the data processing section 81 maintains the transmission stoppage of transfer data, and also outputs an appropriate printer separation signal to the circuitry on the body side of the image forming device 16. This allows the operational conditions of the image forming device 16 to be kept normal. Here, the detachable switch 65 and the switch detecting section 82 together constitute a release sensor.

On the printer unit 23 side, there are provided the control section 90 and an output section 100. The control section 90 includes an input interface 91 that receives transfer data from the data processing section 81 provided in the output section 80, a ROM 92 fixedly storing programs and data for printing, a RAM 93 temporarily holding various data including image files and the like, a CPU 94 that appropriately processes transfer data received in the input interface 91 into printing data signals of an appropriate form, and an output interface 95 that converts printing data signals outputted from the CPU 94 into drive signals for a thermal head and the like. Out of these, the ROM 92, RAM 93 and CPU 94 constitute together an image developing section 97. As a whole, they have the function of converting an inputted image file such as JPG into two-dimensional pixel data for printing.

The output section 100 includes a thermal head 101 to thermally transfer ink, a head drive circuit 102 appropriately actuate the thermal head 101 at an appropriate timing, a motor 103 to feed paper and an ink ribbon, and a motor drive circuit 105 to actuate the motor 103 at an appropriate timing. The output section 100 synchronously feeds printing paper and an ink ribbon in an specified direction based on a drive signal received from the output interface 95. On the feed path, it performs a thermal transfer from the ink ribbon to the printing paper by the thermal head 101 provided so as to orthogonally intersect the feed path.

Hereinafter, the overall operations of the television receiver 10 according to this exemplary embodiment will be described. Upon switching-on of the television receiver 10, the image forming device 16 is activated and television images and the like are projected onto the display screen 14. Here, by appropriately operating the operation section 25 and the like, a printing command requiring an image being displayed on the display screen 14 to be printed out, is input into the image forming device 16. As a result, a printing command signal is issued from the data processing section 81 provided in the output section 80 to the printer unit 23, together with an image file appropriately converted from video signals. The image developing section 97 provided in the printer unit 23 develops the inputted image file, prints a corresponding image, and outputs the image.

When the printer unit 23 suffers damage, a paper jam occurs during printing, or the ink ribbon cartridge 39 or the like is to be replaced, first the screw member 52 is loosened to open the covering lid 37, and the operation lever 41 is unlocked. Next, the operation lever 41 is turned from the upward locking position to the lateral release position, thereby releasing the locking member 67. This makes it possible to withdraw the printer unit 23 from the slot 19. Herein, since the detachable switch 65 is switched from an off-position to an on-position, the data processing section 81 forcedly terminates the data transfer to the printer unit 23, thereby completing the preparation for separation between the circuit on the image forming device 16 side and that on the printer unit 23 side. In this state, when the printer unit 23 is a little withdrawn from the slot 19, the connector 43 provided on the rear surface of the printer unit 23 is separated from a connector provided at the back of the slot 19, whereby the separation between these circuits is completed without causing any abnormal operation of the image forming device 16. When the printer unit 23 is further withdrawn from the slot 19, the printer unit 23 can be demounted as a single piece, so that the demounting of the printer unit 23 can be easily completed.

After repairing a damaged portion or after removing jammed paper, the work procedure of assembling the printer unit 23 into the television receiver 10, after the replacement of the ink ribbon cartridge 39 or the like, is the reverse of the above-described demounting procedure. Specifically, by inserting the printer unit 23 into the slot 19 from the rear surface side thereof as far as it will go, the connector 43 provided on the rear surface of the printer unit 23 is connected to the connector provided at the back of the slot 19. In this state, the locking member 67 protruded from the back of the slot 19 is inserted into the opening 45. Next, the operation lever 41 is turned from the lateral release position to the upward locking position to fix the locking member 67. Here, since the detachable switch 65 is switched from an on-position to an off-position, the data processing section 81 completes the connection processing between the circuit on the image forming device 16 side and that on the printer unit 23 side, and restarts the data transfer to the printer unit 23. Last, the covering lid 37 is closed to lock the operation lever 41 in the locking position, and the screw member 52 is tightened, thereby completing the assembling work.

Figure 7:
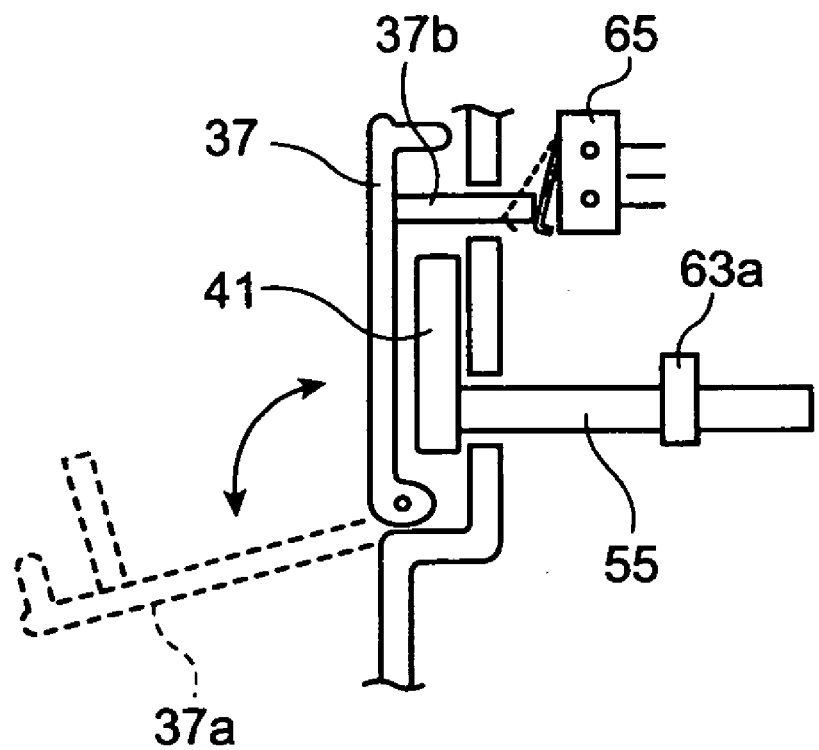
FIG. 7 is a schematic illustrating a detachable switch and others according to another exemplary embodiment of the present invention.

FIG. 7 is a schematic illustrating another exemplary embodiment of the present invention. In this exemplary embodiment, the detachable switch 65 operatively associated with a protrusion 37b provided in the covering lid 37. When the covering lid 37 is closed, the detachable switch 65 is in an on-position, and when the covering lid 37 is opened in the state of 37a, the detachable switch 65 is in an off-position. The on/off-position of the detachable switch 65 is the reverse of that in the exemplary embodiment shown in FIG. 5. However, by reversing the determination criterion of the switch detecting section 82, the same control as that in the exemplary embodiment in FIG. 5 can be implemented. According to the features of the detachable switch 65 and the covering lid 37 in this exemplary embodiment, when the user opens the covering lid 37 to withdraw the printer unit 23, the switch detecting section 82 detects a change in the state of the detachable switch 65, and can start the termination processing of the receiver and printer by the interrupting device. Therefore, the user can perform termination processing in good time before the printer 23 is withdrawn.

Hereinafter, descriptions will be made of the circuit structure of the television receiver 10 in FIG. 1 that has therein the switch 65 in FIG. 7, and mounting and demounting operations of the printer unit 23.

Figure 8:
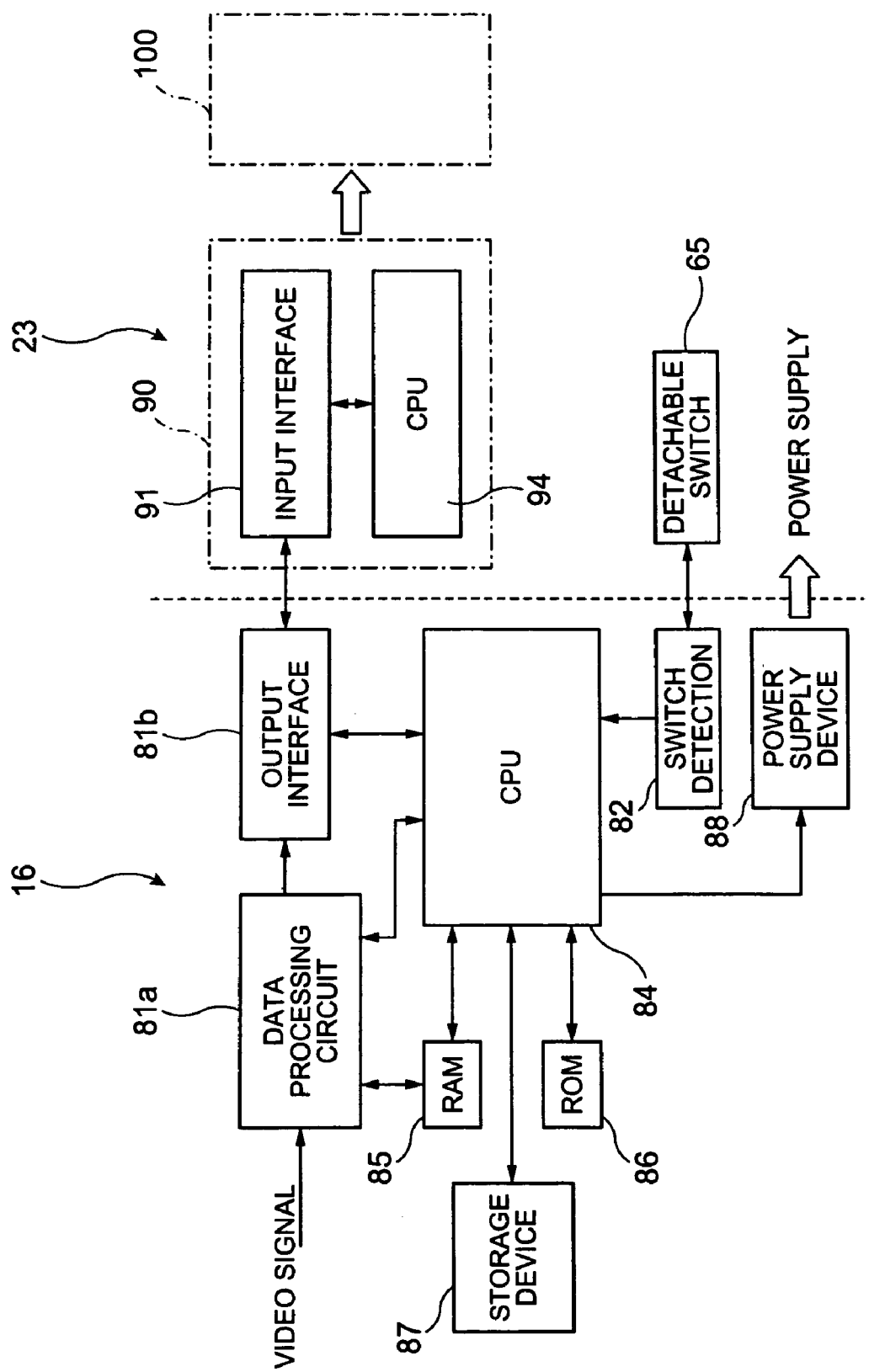
FIG. 8 is a circuit schematic illustrating a television receiver utilizing the detachable switch shown in FIG. 7.

FIG. 8 is a schematic of the circuit portion of the television receiver 10 corresponding to FIG. 6. In FIG. 8, the circuitry on the image forming device 16 side is partially changed and represented in more detail, while the circuitry on the printer unit 23 side is represented in a more simplified manner. The image forming device 16 includes a data processing section including an image processing circuit 81a and an output interface 81b, and in addition, a switch detecting section 82 to detect the state of the detachable switch 65, a CPU 84 to control overall operations, a ROM 85 to fixedly store programs and data for the receiver, a RAM 86 to temporarily hold various data, and a storage device 87, such as a hard disk, to rewritably store various files. With these features, the image processing circuit 81a creates an image file corresponding to an appropriate still image based on received video signals. The image processing circuit 81a can also create another type of file with a form exclusively for printing, by subjecting such an image file to appropriate filter processing. The CPU 84 on the image forming device 16 side is adapted to be able to establish a communication protocol with the CPU 94 on the printer unit 23 side via the output interface 81b, thereby allowing necessary data communications between the image forming device 16 and the printer unit 23. When it has been detected, by the detachable switch, serving as the release sensor, that the printer unit 23 has entered into a state of readiness for separation, if the printer unit 23 is in course of performing or preparing for print processing, both CPUs 84 and 94 serve as controllers that cause the printer unit 23 to perform forced print interruption processing. Here, the image forming device 16 has a power supply device 88 to supply power to the printer unit 23. The CPU 84 can control operations of this power supply device 88 to switch the power supply to the printer unit 23 between ON and OFF at an appropriate timing.

Figure 9:
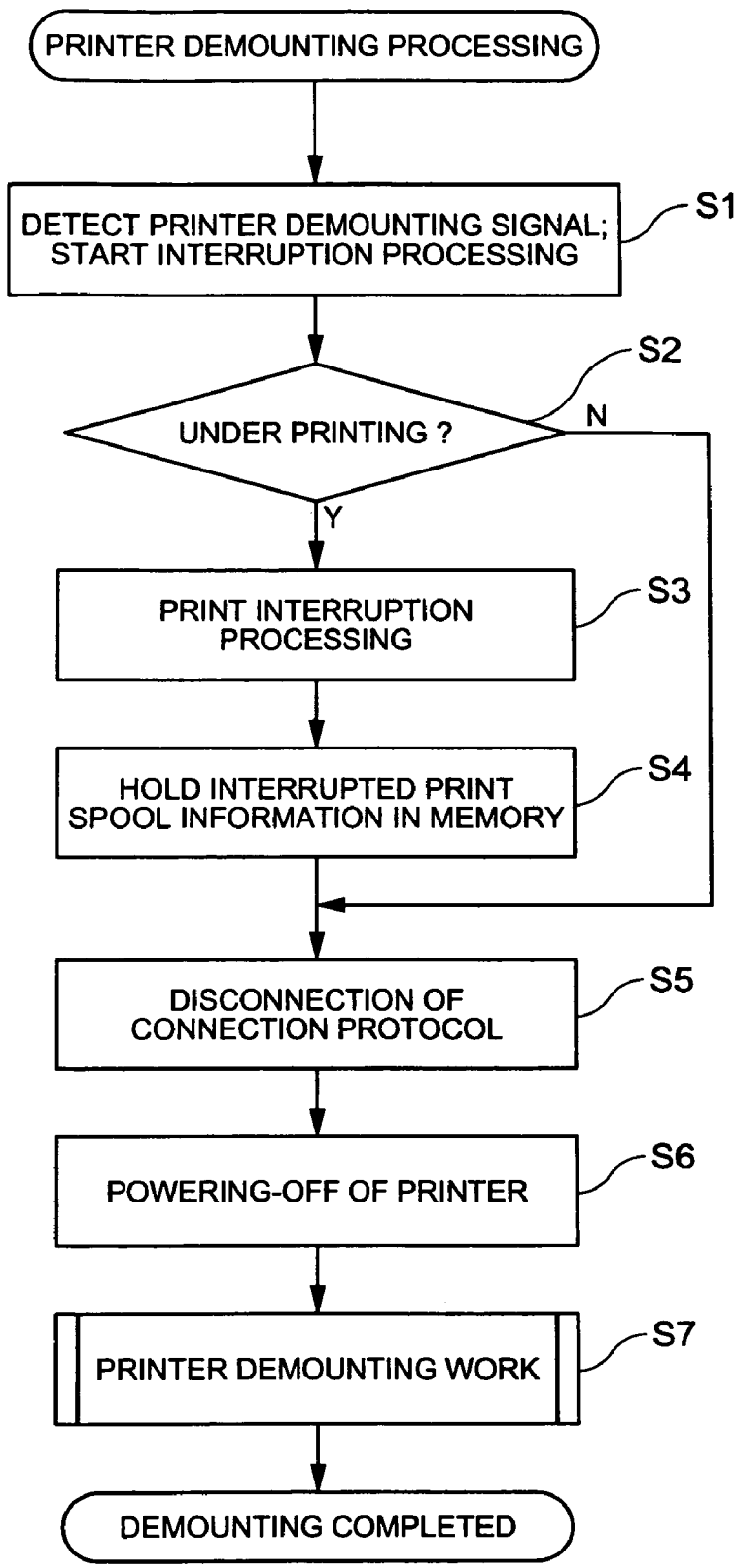
FIG. 9 is a flowchart explaining the demounting of the printer using the circuitry shown in FIG. 8.

FIG. 9 is a flowchart explaining the demounting of the printer unit 23. When the user opens the covering lid 37 to demount the printer unit 23 from the image forming device 16, the switch detecting section 82 shown in FIG. 6 detects a change in state of the detachable switch 65 as being a "printer demounting signal", and outputs this "printer demounting signal" to the CPU 84. In response to this, the CPU 84 executes interruption processing to start demounting processing described below (step S1).

Next, the CPU 84 determines whether printing is in progress (step S2). Specifically, the CPU 84 determines whether print spool information is in the course of being sent to the control section 90 on the printer unit 23 side via the output interface 81b. Such print spool information may be made transfer data constituting an image file as illustrated in FIG. 6, or alternatively may be made another type of file with a form exclusively for printing by applying an appropriate filter processing.

Also, the CPU 84 performs communications with the CPU 94 via the output interface 81b and the input interface 91, and obtains information as to whether the printing has been completed. When the printer unit is out of order for some reason, when the time consumables, such as inks, are to be replenished has come, and when printing paper is jammed in a paper feeding path in the printer unit 23, the CPU 84 determines that the printing has not yet been completed but is in progress.

In step S2, if it is determined that the printing is in progress, the CPU 84 executes print interruption processing (step S3). For example, the CPU 84 interrupts the outputting of print spool information in the course of being sent to the printer unit 23 side via the output interface 81b. Simultaneously, the CPU 84 performs data communications with the CPU 94 via the output interface 81b and the input interface 91, and if there is any print processing that the CPU 94 on the printer unit 23 side is in course of executing, the CPU 84 outputs a command to stop this processing. The CPU 94 outputs an appropriate signal to the output interface 95, and immediately interrupts the processing in the output section 100 in order to interrupt printing onto printing paper that is in course of being fed. For example, when the printing has already been started up, the CPU 94 forces the thermal head 101 to terminate its operation, and completes a paper discharge by performing a paper feed by the motor 103 at a maximum speed.

Next, the CPU 84 holds interrupted print spool information in the RAM 86 or the storage device 87 (step S4). Specifically, if there is any print spool information that has been confirmed to be under transmission in step S2, the CPU 84 stores the print spool information that is temporarily stored in a spool data region in the storage device 87 at this point in time, in another storage region (data region for print restart) in the storage device 87. Also, when the print spool information has been completely transferred to the control section 90 of the printer unit 23, the CPU 84 stores latest print spool information that is stored in the spool data region in the storage device 87, in another storage region (data region for print restart) in the storage device 87, as well. When the print spool information in the spool data region in the storage device 87 is erased after the transfer of the print spool information to the printer unit 23 side has been completed, it is possible to read back the print spool information from the control section 90.

Then, the CPU 84 disconnects the connection protocol between the printer unit 23 and the control section 90 (step S5). Specifically, the CPU 84 executes processing to safely interrupt the communication protocol with the control section 90 via the output interface 81b. Thereby, data communications between the television receiver 10 and the printer unit 23 are smoothly interrupted without impairing the data and behavior stability or the like of both of them.

Next, the CPU 84 outputs a control signal to the power supply device 88 to stop/interrupt the power supply to the printer unit 23 (step S6). The foregoing steps (step S1 to S6) proceeds immediately after the user has opened the covering lid 37 of the printer unit 23. Before the user operates the operation lever 41 to unlock the printer unit 23, a given time has elapsed, the foregoing steps have been completed through step S6, and the power supply to the printer unit 23 has been stopped.

In this situation, when the user operates the operation lever 41 to unlock the printer unit 23, the printer unit 23 can be withdrawn from the slot 19. The user demounts the printer unit 23 from the television receiver 10 as a single piece, thereby accomplishing a mechanical separation (step S7).

Figure 10:
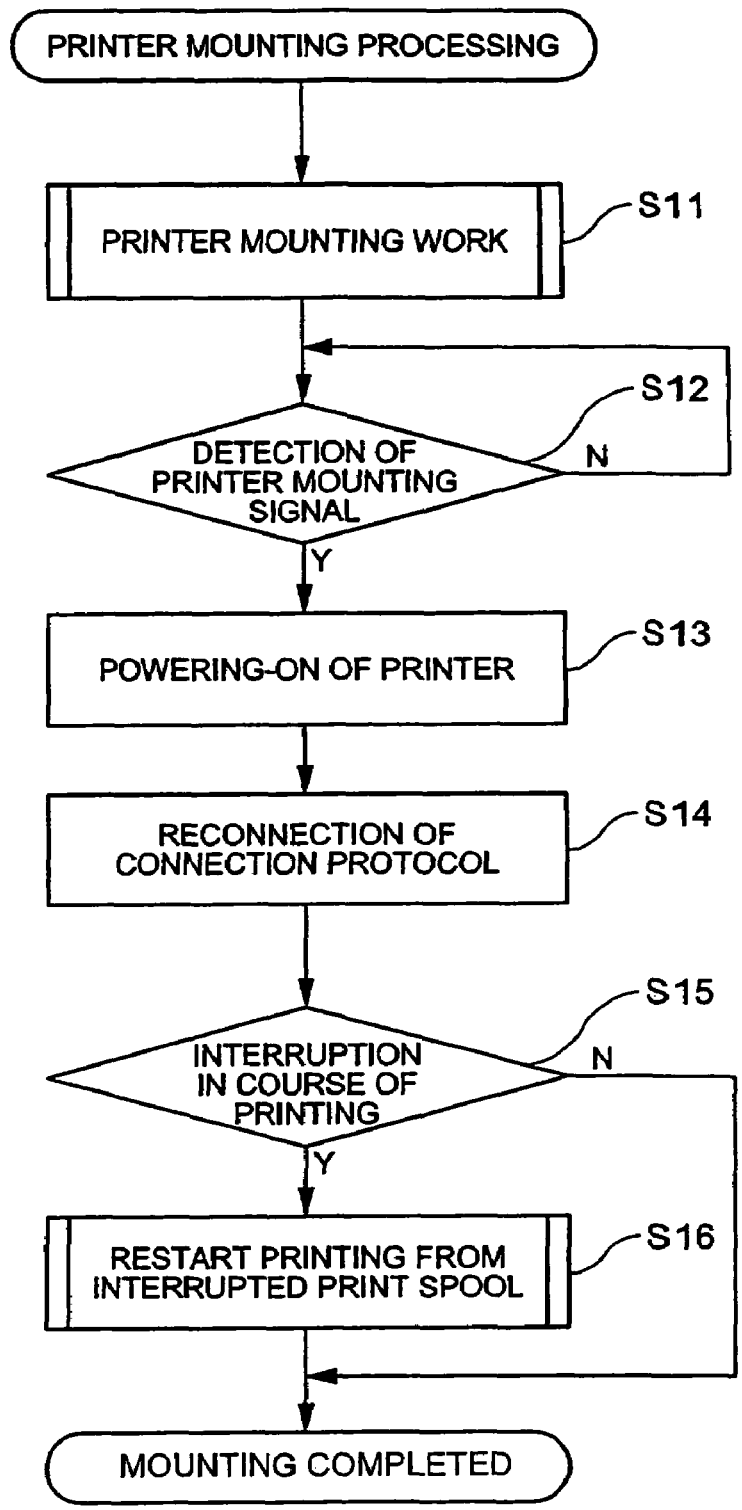
FIG. 10 is a flowchart explaining the mounting of the printer using the circuitry shown in FIG. 8.

FIG. 10 is a flowchart explaining the mounting of the printer unit 23. The user inserts the printer unit 23 into the slot 19 in the television receiver 10 from the rear surface side thereof as far as it will go, and connects the connector 43 provided on the rear surface of the printer unit 23 to the connector provided at the back of the slot 19 (step S11). Here, by rotating the operation lever 41 from the release position to the locking position and fixing it the locking member 67, the printer unit 23 can be mechanically connected to the slot 19 in the television receiver 10 and electrically connected to the image forming device 16.

By the above-described operation of the operation lever 41, the switch detecting section 82, serving as the locking sensor, detects a change in state of the detachable switch 65, constituting the locking sensor as well, as a printer mounting signal, and outputs it to the CPU 84. In response to this, the CPU 84 sets forward interruption processing in order to start up the mounting processing described below (step S12).

Thereafter, the CPU 84 outputs a control signal to the power supply device 88 to start up a power supply to the printer unit 23 (step S13). Thus, the control section 90 and the output section 100 of the printer unit 23 start up operations. Thereby a warming up of the printer unit 23 is conducted.

Next, the CPU 84 restarts the connection protocol with the control section 90 of the printer unit 23 (step S14). Specifically, the CPU 84 executes processing to establish the communication protocol with the control section 90 via the output interface 81b. Thus, data communications between the image forming device 16 and the printer unit 23 are restarted.

Then, the CPU 84 determines whether the last mounting of the printer unit 23 was accompanied with a forced interruption in the course of printing (step S15). The CPU 84 determines whether, upon the determination that printing was in progress in step S2 in the flowchart in FIG. 9, print interruption processing (step S3) was executed. Interruption processing in course of sending print spool information, and interruption processing aimed at repair including paper jamming or the like and maintenance, is determined to be a forced termination of printing.

If the mounting of the printer unit 23 was accompanied with a forced termination of printing, the CPU 84 again reads the print spool information that has not yet been completed due to the interruption, and restarts printing (step S16). Specifically, the CPU 84 reads the print spool information stored in the data region for print restart in the storage device 87, and transfers it together with a print command to the control section 90 in the printer unit 23. Thereby, the printing by the printer unit 23 is restarted, the printing having been performed immediately before the mounting. If the mounting of the printer unit 23 was not accompanied with a forced termination of printing, the restart of printing as described above is not performed.

According to the above descriptions, the CPU 84 on the image forming device 16 dominantly executes the print interruption processing (step S3), storage of print spool information (step S4), disconnection of the connection protocol (step S5), powering-off of the printer unit 23 (step S6) and the like. Alternatively, however, the CPU 94 on the printer unit 23 may dominantly execute the same processing as the foregoing.

Likewise, according to the above descriptions, the CPU 84 on the image forming device 16 dominantly executes the powering on of the printer unit 23 (step S13), restart of the connection protocol (step S14), and print restart processing (start S16) and the like. Alternatively, however, the CPU 94 on the printer unit 23 may dominantly execute the same processing as the foregoing.

Hereinbefore, the present invention has been described in line with the above-described exemplary embodiments, but the present invention is not limited to these exemplary embodiments. For example, in the above-described exemplary embodiments, the locking unit 70 has been treated as being a mechanical mechanisms. However, the locking unit 70 may be a mechanism that electromagnetically performs a similar function to those of the above-described exemplary embodiments. Here, the operation lever 41 can be replaced by a button or the like. Such a button may be disposed on the image forming device 16 side, specifically, on the body side of the television receiver 10.

Also, the arrangements for the transmission/reception of electrical signals between the image forming device 16 and the printer unit 23, and for the signal processing are not restricted to the those illustrated in FIGS. 6 and 8. Any modifications that can achieve the separation of electrical circuits as easily and reliably as the cases of the above-described exemplary embodiments, may be used.

Furthermore, in the above-described exemplary embodiments, although there is provided a detachable switch 65 to detect operations of the operation lever 41, a switch to detect a state where the printer unit 23 has been minutely withdrawn from the slot 19, may be provided instead of the detachable switch 65.

Moreover, any arrangements that can detect a state where the screw member 52 is loosened may be used in place of the detachable switch 65.

Also, although the printer unit 23 equipped with a thermal head or the like has been taken as an example, an ink jet type printer head equipped with an ink cartridge may instead be used as a matter of course.

The invention claimed is:

1. An image display device, comprising:
    a display screen formed on the front of a cabinet and occupying the main part of the front;
    an image forming device that, based on read image signals, forms an image corresponding to the image signals on the display screen; and
    a printer unit demountably accommodated in a recess formed in the cabinet, the printer unit comprising a paper feed tray for accommodating printer paper, a paper discharge slot in a front side of the printer unit, and a paper feed slot at a rear portion of the paper feed tray.

2. The image display device according to claim 1, further comprising:

a guide to guide the movement of the printer unit in the recess during the mounting and demounting of the printer unit; and a connector that allows the exchange of signals between the image forming device and the printer unit, and that is disconnectable and connectable therebetween.

3. The image display device according to claim 2, further comprising:

a locking device to bring the printer unit into a locked state where the printer unit is fixed to the recess, in a state where the printer unit has been accommodated in the recess and the electrical connection between the image forming device and the printer unit has been established by the connector device.

4. The image display device according to claim 3, further comprising:

a lock element to prevent the locked state of the printer unit brought about by the locking device from being released.

5. The image display device according to claim 3, further comprising:

a release sensor to detect a release operation with respect to the locked state of the printer unit brought about by the locking device.

6. An image display device, comprising:

a display screen formed on the front of a cabinet and occupying the main part of the front;

an image forming device that, based on read image signals, forms an image corresponding to the image signals on the display screen;

a printer unit demountably accommodated in a recess formed in the cabinet;

a connector that allows the exchange of signals between the image forming device and the printer unit, and that is disconnectable and connectable therebetween;

a locking device to bring the printer unit into a locked state where the printer unit is fixed to the recess, in a state where the printer unit has been accommodated in the recess and the electrical connection between the image forming device and the printer unit has been established by the connector;

a release sensor to detect a release operation with respect to the locked state of the printer unit brought about by the locking device; and a controller to cause the printer unit to perform forced print interruption processing if the printer unit is in course of performing print processing or preparing for print processing, when the release of the locked state has been detected by the release sensor.

7. The image display device according to claim 6, when the release of the locked state has been detected by the release sensor, if there is any print processing that is in course of being performed or prepared in the printer unit, the controller interrupting a power supply to the printer unit after the print interruption processing.

8. The image display device according to claim 6, when the release of the locked state has been detected by the release sensor, the controller terminates the exchange of signals between the image forming device and the printer unit.

9. The image display device according to claim 8, the controller including a first CPU provided in the image forming device and a second CPU provided in the printer unit, the controller causing the printer unit to perform print processing by passing data signals between the first and second CPUs by communications based on a predetermined connection protocol, and before interrupting a power supply to the printer unit, the controller terminating in advance the communications based on the predetermined connection protocol between the first and second CPUs.

10. The image display device according to claim 6, further comprising:

a locking sensor to detect that the printer unit is held in the locked state by the locking device.

11. The image display device according to claim 10, the locking sensor and the release sensor constituting a common detachable switch provided in the locking device, to detect the displacement of a movable member, and the locking sensor and the release sensor detecting the locked state and the release of the locked state based on a state of the detachable switch.

12. The image display device according to claim 10, when the return to the locked state has been detected by the locking sensor, if printing is under forced interruption due to last demounting of the printer unit, the controller causing the printer unit to restart the interrupted printing.

* * * * *